(12) United States Patent
Landwehr et al.

(10) Patent No.: US 10,787,945 B2
(45) Date of Patent: Sep. 29, 2020

(54) UREA DEPOSIT GROWTH THERMAL MANAGEMENT VIA MULTI-ZONE ALTERNATING VARIABLE DIESEL EXHAUST FLUID INJECTION UTILIZING A PHYSICS-BASED DEPOSIT GROWTH AND DECAY MODEL

(71) Applicant: Caterpillar Inc., Peoria, IL (US)

(72) Inventors: Dustin I. Landwehr, Kewanee, IL (US); Jay Venkataraghavan, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 135 days.

(21) Appl. No.: 15/992,628

(22) Filed: May 30, 2018

(65) Prior Publication Data
US 2019/0368400 A1    Dec. 5, 2019

(51) Int. Cl.
*F01N 3/20* (2006.01)
*B01D 53/94* (2006.01)

(52) U.S. Cl.
CPC ......... *F01N 3/208* (2013.01); *B01D 53/9418* (2013.01); *B01D 53/9495* (2013.01); *F01N 2900/0411* (2013.01); *F01N 2900/1602* (2013.01); *F01N 2900/1812* (2013.01)

(58) Field of Classification Search
CPC ............ F01N 3/208; F01N 2900/1602; F01N 2900/0411; F01N 2900/1812; B01D 53/9418; B01D 53/9495
See application file for complete search history.

(56) References Cited

U.S. PATENT DOCUMENTS

| 8,109,077 | B2 | 2/2012 | Reba et al. | |
| 9,512,763 | B2 | 12/2016 | Hudgens et al. | |
| 9,624,805 | B2* | 4/2017 | Wentzel | F01N 3/208 |
| 9,677,445 | B2 | 6/2017 | Nunez et al. | |
| 2010/0122525 | A1* | 5/2010 | Fujita | F01N 3/106 60/285 |
| 2011/0030343 | A1* | 2/2011 | Kiser | F01N 3/208 60/274 |
| 2011/0146240 | A1* | 6/2011 | Wilhelm | F01N 3/106 60/274 |

(Continued)

FOREIGN PATENT DOCUMENTS

WO     2017050814     3/2017

*Primary Examiner* — Matthew T Largi
(74) *Attorney, Agent, or Firm* — Harrity & Harrity LLP

(57) ABSTRACT

A dosing control unit (DCU) may receive operational information associated with a selective catalytic reduction (SCR) aftertreatment system. The DCU may generate a deposit prediction, associated with the SCR aftertreatment system, based on the operational information. The deposit prediction may include information that identifies a predicted size of a deposit in a dosing zone of a plurality of dosing zones associated with the SCR aftertreatment system. The deposit prediction may be generated using a deposit growth model associated with predicting sizes of deposits in the plurality of dosing zones. The DCU may select a dosing scheme, of a plurality of dosing schemes, based on the deposit prediction. The DCU may implement the selected dosing scheme in order to cause diesel exhaust fluid (DEF) to be dosed in the plurality of dosing zones in accordance with the selected dosing scheme.

20 Claims, 4 Drawing Sheets

(56) References Cited

U.S. PATENT DOCUMENTS

| | | | |
|---|---|---|---|
| 2012/0006010 A1* | 1/2012 | Kaemingk | F01N 3/208 60/286 |
| 2012/0090296 A1* | 4/2012 | Yacoub | F01N 3/208 60/274 |
| 2013/0343959 A1* | 12/2013 | Golin | F01N 3/103 422/170 |
| 2015/0128564 A1* | 5/2015 | Upadhyay | F01N 3/2066 60/274 |
| 2015/0196878 A1* | 7/2015 | Nunez | F01N 3/208 423/212 |
| 2016/0090887 A1* | 3/2016 | Mitchell | F01N 3/208 60/274 |
| 2016/0160725 A1* | 6/2016 | Hudgens | F01N 3/2066 60/274 |
| 2016/0376965 A1 | 12/2016 | Mittal et al. | |
| 2017/0234186 A1* | 8/2017 | Saitoh | F01N 3/208 60/301 |

* cited by examiner

United States Patent US 10,787,945 B2

UREA DEPOSIT GROWTH THERMAL MANAGEMENT VIA MULTI-ZONE ALTERNATING VARIABLE DIESEL EXHAUST FLUID INJECTION UTILIZING A PHYSICS-BASED DEPOSIT GROWTH AND DECAY MODEL

TECHNICAL FIELD

The present disclosure relates generally to managing urea deposit growth in an exhaust gas treatment system that uses diesel exhaust fluid (DEF) injection and, more particularly, to managing urea deposit growth in an exhaust gas treatment system via multi-zone alternating variable DEF dosing utilizing a physics-based deposit growth and decay model.

BACKGROUND

A diesel engine is a type of internal combustion engine that uses the heat generated through compression of fuel and oxygen to initiate the ignition of that fuel that has been injected into the combustion chamber of the engine. In the combustion chamber, the fuel is combusted in the presence of oxygen in order to produce high-temperature and high-pressure combustion products which apply a force to one or more components of the diesel engine, thereby providing mechanical energy. The exhaust gas emitted from a diesel engine may contain various gaseous emissions, such as nitrogen oxides ($NO_x$) (e.g., nitric oxide (NO), nitrogen dioxide ($NO_2$), and/or the like). When released into the atmosphere, $NO_2$ may develop as a yellow-brown haze over cities, and is one of the components of smog.

In an effort to decrease the amount of $NO_x$ released into the atmosphere, increasingly stringent emission standards require limiting the amount of $NO_x$ emissions. One type of diesel engine exhaust treatment technology that has been used to reduce $NO_x$ emissions from diesel engines is a selective catalytic reduction (SCR) aftertreatment system. In operation, a reductant, such as an aqueous urea solution, also referred to as diesel exhaust fluid (DEF), is dosed into exhaust gas upstream of a SCR catalyst. The DEF may decompose to ammonia and, in the presence of the SCR catalyst, the ammonia may serve as a reducing agent to reduce the $NO_x$ in the exhaust gas to nitrogen and water, which are then expelled through the tailpipe. In this way, SCR aftertreatment systems may reduce $NO_x$ emissions. In some cases, multiple DEF injectors and/or multiple SCR aftertreatment systems may be placed in the exhaust stream in order to meet emission standards.

While somewhat effective, current DEF dosing systems may suffer from a number of drawbacks. For example, accurate control and prediction of the amount of DEF dosed into the exhaust stream may be complicated by the tendency of DEF to form deposits in the exhaust system. When such deposits are formed, an insufficient amount of DEF may decompose to ammonia in the exhaust stream and, thus, adequate $NO_x$ reduction may not be achieved.

One attempt to prevent DEF deposit growth is disclosed in U.S. Patent Application Publication No. 2016/0090887 that was filed by Cummins Emission Solutions, Inc., on Sep. 21, 2015 ("the '887 application"). In particular, the '887 application discloses a SCR system that utilizes constant volume, variable timing reductant injection (e.g., a constant dose amount of DEF at variable time intervals between successive doses) to treat exhaust gases from a diesel engine, where an interval between the constant volume doses of DEF is adjusted based on the amount of $NO_x$ within the exhaust gases at a given point in time.

Further, the '887 application discloses mitigating deposit buildup through selectively spraying the constant volume DEF doses from either a first injector or a second injector at different times (e.g., such that only one of the first or second injectors is spraying DEF at any given time). The '887 application discloses a number of techniques for alternating the spraying of DEF between the first and second injectors, including: alternating after each constant volume DEF dose; alternating after a threshold amount of DEF has been dosed by either injector; measuring (using a sensor or another device) a size of a buildup and switching between injectors when the buildup reaches a threshold size; monitoring the exhaust gases for unusual changes in ammonia slip, unusual increases in $NO_x$ downstream of the system, or increased pressure restriction of the system, and switching between injectors when an appropriate indicator is detected; and measuring a surface temperature of an exhaust system component and switching between injectors when the surface temperature falls below a threshold temperature. However, while the techniques described in the '887 application may reduce risk of DEF deposit formation as compared to a solution that uses fixed-timing, variable volume DEF injection, the relatively simple techniques for "alternation" described by the '887 application may be insufficient in order to reliably prevent deposit growth.

The multi-zone alternating variable DEF dosing technique that utilizes a physics-based deposit growth and decay model of the present disclosure solves one or more of the problems set forth above and/or other problems in the art.

SUMMARY

In one aspect, the present disclosure is related to a dosing control unit (DCU). The DCU may include one or more memories and one or more processors, communicatively coupled to the one or more memories. The DCU may receive operational information associated with a selective catalytic reduction (SCR) aftertreatment system, and generate a deposit prediction, associated with the SCR aftertreatment system, based on the operational information. The deposit prediction may include information that identifies a predicted size of a deposit in a dosing zone of a plurality of dosing zones associated with the SCR aftertreatment system. The deposit prediction may be generated using a deposit growth model associated with predicting sizes of deposits in the plurality of dosing zones. The DCU may select a dosing scheme, of a plurality of dosing schemes, based on the deposit prediction. The DCU may implement the selected dosing scheme in order to cause diesel exhaust fluid (DEF) to be dosed in the plurality of dosing zones in accordance with the selected dosing scheme.

In another aspect, the present disclosure is related to a SCR aftertreatment system comprising one or more devices. The one or more devices may receive operational information associated with the SCR aftertreatment system. The one or more devices may generate, based on the operational information, a deposit prediction that includes information that identifies a predicted size of a deposit in a dosing zone of a plurality of dosing zones associated with an inlet of the SCR aftertreatment system. The deposit prediction may be generated using a deposit growth model configured to predict sizes of deposits in the plurality of dosing zones. The one or more devices may select a dosing scheme, of a plurality of dosing schemes, based on the deposit prediction. The one or more devices may implement the selected dosing scheme in order to cause DEF to be dosed in the inlet in accordance with the selected dosing scheme.

In yet another aspect, the present disclosure is related to a method. The method may include receiving, by a device, operational information associated with a SCR aftertreatment system, and generating, by the device and based on the operational information, a deposit prediction associated with the SCR aftertreatment system. The deposit prediction may include information that identifies a predicted size of a deposit in a dosing zone of a plurality of dosing zones associated with the SCR aftertreatment system. The deposit prediction may be generated using a deposit growth model associated with predicting sizes of deposits in the plurality of dosing zones. The method may include selecting, by the device, a dosing scheme, of a plurality of dosing schemes, based on the deposit prediction. The method may include causing, by the device, DEF to be dosed in the plurality of dosing zones in accordance with the selected dosing scheme.

DETAILED DESCRIPTION

Figure 1:
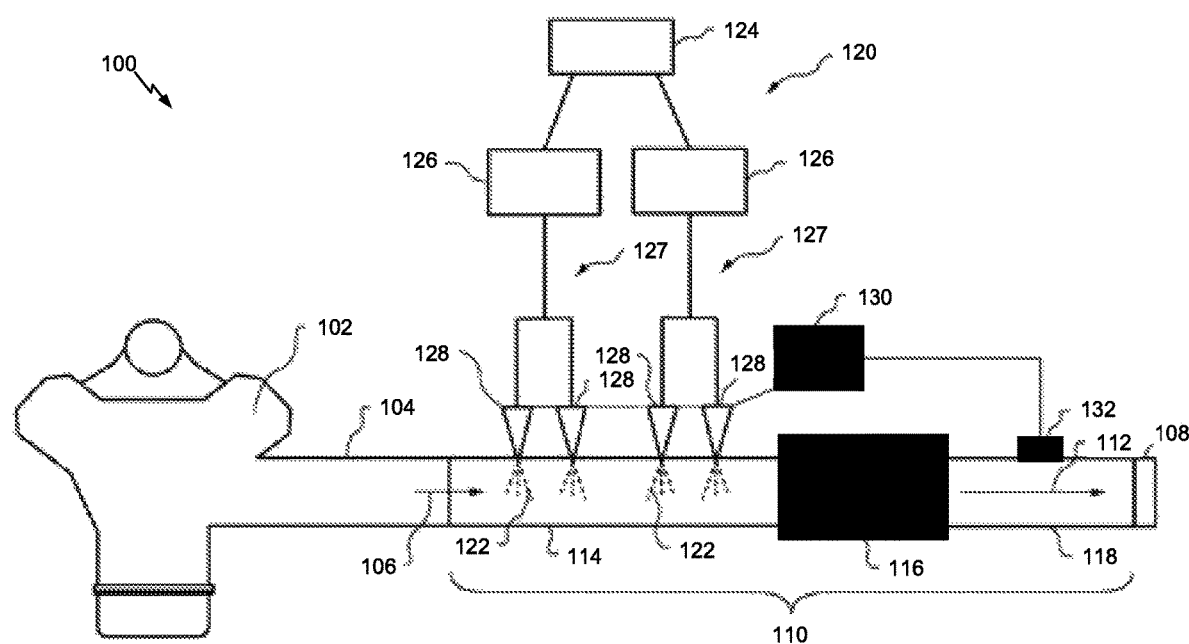
FIGS. 1 and 2 are diagrams of an example schematic representation of a SCR aftertreatment system associated with a diesel engine.

FIG. 1 is a diagram of an example schematic representation of a diesel engine 100 including a SCR aftertreatment system 110. In some implementations, diesel engine 100 may be a large engine (e.g., an engine having a horsepower of 750 or more), although diesel engine 100 may have a smaller horsepower, in some cases. As non-limiting examples, diesel engine 100 may be used in a mining truck, a hydraulic mining shovel, a tractor, a wheel loader, an electric power generator, and/or another type of machine.

As shown in FIG. 1, diesel engine 100 may include at least one combustion chamber 102 where fuel may be combusted with oxygen, and exhaust line 104 for carrying exhaust gas 106 to tailpipe 108. As shown, diesel engine 100 may further include one or more SCR aftertreatment systems 110 disposed in and in fluid communication with exhaust line 104.

In some implementations, SCR aftertreatment system 110 may convert exhaust gas 106 to treated gas 112 (e.g., a gas with a reduced $NO_x$ content as compared to exhaust gas 106) that may then be released from diesel engine 100 through tailpipe 108. Specifically, in the presence of an ammonia-based reductant, SCR aftertreatment system 110 may at least partially convert $NO_x$ in exhaust line 104 to nitrogen and water. It will be understood that engines with comparatively higher volumes of exhaust gas 106 may include one or more SCR aftertreatment systems 110 in exhaust line 104 in order to suitably convert exhaust gas 106 to treated gas 112.

As shown, SCR aftertreatment system 110 may include inlet 114 in fluid communication with exhaust line 104, SCR catalyst 116 downstream of inlet 114, and outlet 118 downstream of SCR catalyst 116. Additional details regarding inlet 114 are described below with regard to FIG. 2. In some implementations, SCR catalyst 116 may include a flow-through ceramic having a catalytic composition applied thereto. In some implementations, the catalytic composition may include zeolite and one or more metal components, such as vanadium, iron, cobalt, platinum, palladium, copper, and/or the like.

As further shown in FIG. 1, SCR aftertreatment system 110 may include a dosing system 120 configured to dose (e.g., as a mist or spray) a reductant, such as diesel exhaust fluid (DEF) 122, into inlet 114 for mixing with exhaust gas 106. In some implementations, DEF 122 may be a solution of urea in water, such as a solution of approximately 32.5% urea in approximately 67.5% water, although solutions with different urea contents may also be used. When dosed into inlet 114, DEF 122 may produce ammonia which may serve as a reducing agent to reduce $NO_x$ in exhaust gas 106 to nitrogen and water in the presence of SCR catalyst 116.

As shown, dosing system 120 may include supply tank 124 containing a supply of DEF 122, and one or more pumps 126, each configured to pump DEF 122 out of supply tank 124. As further shown, dosing system 120 may include one or more DEF supply lines 127, each configured to deliver DEF 122 from a respective one of the one or more pumps 126 to a set of injectors 128. As particular example, and as shown in FIG. 1, SCR aftertreatment system 110 may include two pumps 126, each delivering DEF 122 to a respective set of two injectors 128 via a respective DEF supply line 127. It will be understood, however, that a number of pumps 126, a number of DEF supply lines 127, a number of injectors 128 in a given set of injectors 128, and/or a number of sets of injectors 128 in SCR aftertreatment system 110 may differ, in some implementations.

In some implementations, injector 128 may be a solenoid valve controlled by a dosing control unit (DCU) 130, which may be in electrical communication with injector 128. Specifically, DCU 130 may control an amount of DEF 122 dosed into inlet 114 by injector 128 by regulating a length of time during which the valve of injector 128 stays open and/or by controlling a degree to which the valve of injector 128 is opened. In some implementations, DCU 130 may implement a multi-zone alternating variable DEF dosing technique that utilizes a physics-based deposit growth and decay model (herein after referred to as a deposit growth model) in association with controlling injectors 128, as described in further detail below.

In some implementations, DCU 130 may include one or more memories and one or more processors, coupled to the one or more memories. The one or more processors may be capable of being programmed to perform a function described herein, and may be implemented in hardware, firmware, or a combination of hardware and software (e.g., a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component). The one or more memories may include a random access memory (RAM), a read only memory (ROM), and/or another type of dynamic or static storage device that stores information and/or instructions for use by the one or more processors. In some implementations, DCU 130 may include one or more other components, such as a bus, a storage component, an input component, an output component, a communication interface, and/or the like.

In some implementations, DCU 130 may be in electrical communication with one or more sensors 132 positioned at outlet 118, at tailpipe 108, and/or at a comparatively more upstream location, such as near exhaust line 104, near an entrance of inlet 114, near a dosing zone within inlet 114, and/or the like. In some implementations, sensor 132 may be a temperature sensor (e.g., a sensor capable of determining and providing information that identifies a temperature at or near a location at which sensor 132 is arranged). Additionally, or alternatively, sensor 132 may be a flow rate sensor (e.g., a flow meter capable of determining and providing information that identifies a flow rate of gas at or near a location at which sensor 132 is arranged). Additionally, or alternatively, sensor 132 may be a $NO_x$ sensor (e.g., a sensor capable of determining and providing information that identifies an amount of $NO_x$ at or near a location at which sensor 132 is arranged). In some implementations, sensor 132 may include a processor, a memory, a storage component, an input component, an output component, a communication interface, and/or the like.

As indicated above, FIG. 1 is provided as an example. Other examples are possible and may differ from what was described in connection with FIG. 1. In some implementations, diesel engine 100 may include additional components, fewer components, different components, or differently arranged components than those shown in FIG. 1.

Figure 2:
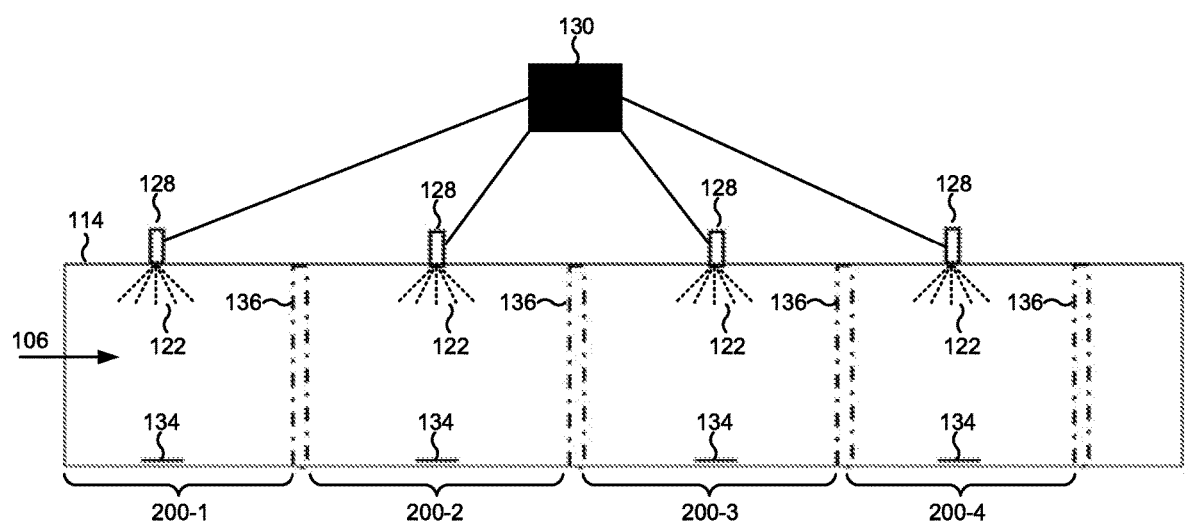
Figure 4:
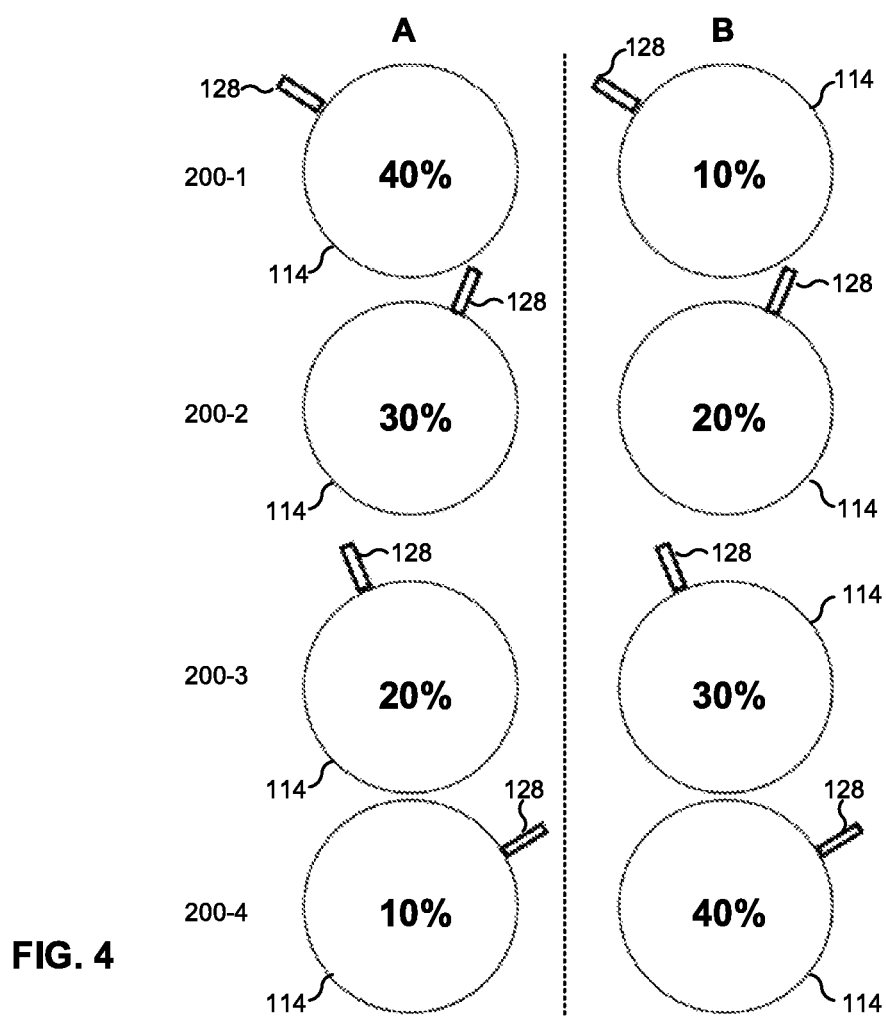
FIG. 4 is a diagram illustrating an example dosing for injectors of a SCR aftertreatment system.

FIG. 2 is a diagram of an example schematic representation of inlet 114 of SCR aftertreatment system 110. As shown in FIG. 2, and as described above, injectors 128 may be arranged to dose DEF 122 into inlet 114 (e.g., based on control signaling provided by DCU 130). For example, injectors 128 may be mounted on or otherwise affixed to inlet 114 such that injectors 128 can dose DEF 122 into inlet 114 via respective openings in inlet 114. In some implementations, one or more injectors 128 may be arranged in a linear arrangement (e.g., such that injectors 128 are aligned along a direction that is substantially parallel to a longitudinal axis of inlet 114). Additionally, or alternatively, one or more injectors 128 may arranged in a non-linear arrangement, an example of which is shown in FIG. 4. As further shown, each injector 128 may be in electrical communication with DCU 130 in order to allow DCU 130 to control DEF dosing by each injector 128 independently. In some implementations, injector 128 may include a processor, a memory, a storage component, an input component, an output component, a communication interface, and/or the like.

As further shown in FIG. 2, inlet 114 may comprise two or more dosing zones 200 (e.g., four dosing zones 200 are shown in FIG. 2, labeled 200-1 through 200-4). In some implementations, injectors 128 may be arranged such that a set of injectors 128 (e.g., one or more injectors 128) can dose DEF 122 in a given dosing zone 200. In some implementations, dosing of DEF 122 within each dosing zone 200 is controlled by DCU 130. In some implementations, DCU 130 may implement a multi-zone alternating variable DEF dosing technique that utilizes a deposit growth model based on may control dosing of DEF 122 in dosing zones 200, as described in further detail below.

As further shown, a set of mixers 136 may be arranged within inlet 114 in order to facilitate the mixing of ammonia (formed from decomposing DEF 122) and exhaust gas 106 within inlet 114 (e.g., such that the ammonia and exhaust gas 106 are mixed before reaching SCR catalyst 116). As shown, in some implementations, a given mixer 136 may be arranged such that the given mixer 136 defines a boundary of an associated dosing zone 200. Additionally, or alternatively, one or more mixers 136 may be arranged at one or more other locations within inlet 114 (e.g., such that the one or more mixers are arranged within an associated dosing zone 200, rather than at a boundary of the associated dosing zone 200).

As further shown in FIG. 2, in some implementations, an impingement plate 134 may be arranged within inlet 114 (e.g., in each dosing zone 200). For example, impingement plate 134 may be affixed to an inner surface of inlet 114 directly across from injector 128 within inlet 114 such that DEF 122, when sprayed by injector 128, is directed generally toward impingement plate 134.

As indicated above, FIG. 2 is provided as an example. Other examples are possible and may differ from what was described in connection with FIG. 2. For example, while FIG. 2 shows inlet 114 as comprising four dosing zones 200, another number of dosing zones 200 (e.g., three or less dosing zones 200, five or more dosing zones 200) may be used, in some implementations. As another example, while FIG. 2 shows each dosing zone 200 being associated with a single injector 128, a given dosing zone 200 may be associated with a set of injectors 128 that includes two or more injectors 128, in some implementations.

Figure 3:
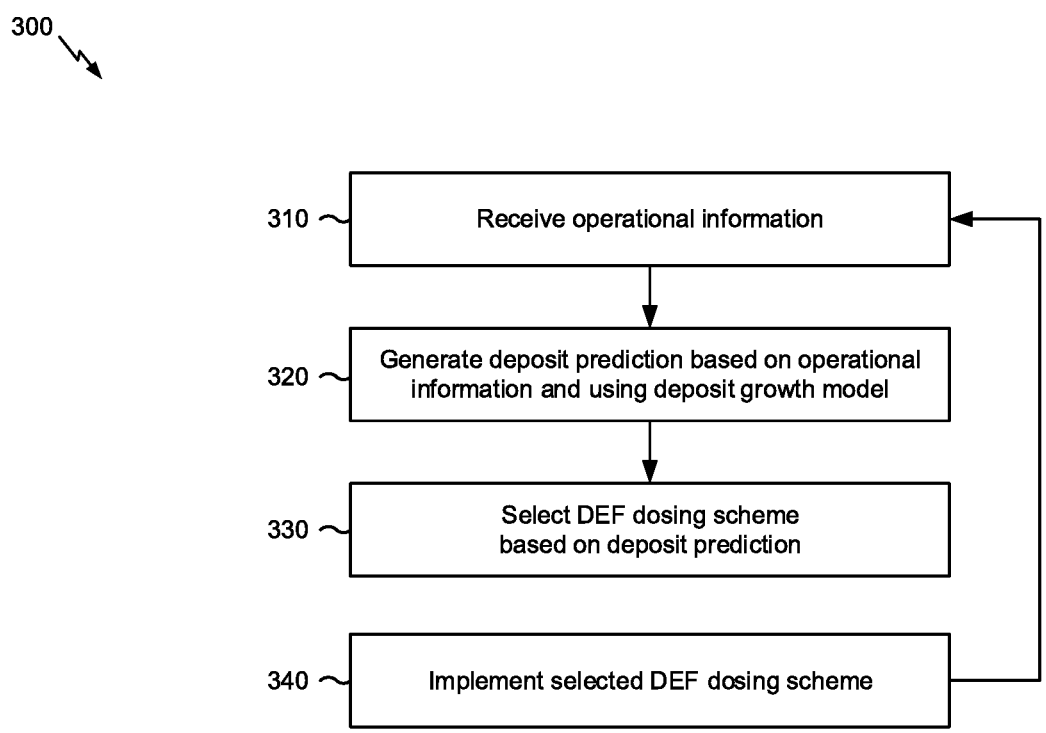
FIG. 3 is a flow chart of an example process for managing urea deposit growth in a SCR aftertreatment system based on a physics-based deposit growth and decay model.

FIG. 3 is a flow chart of an example process 300 for managing urea deposit growth in an exhaust gas treatment system based on a physics-based deposit growth and decay model. In some implementations, one or more process blocks of FIG. 3 may be performed by DCU 130. In some implementations, one or more process blocks of FIG. 3 may be performed by another device or a group of devices separate from or including DCU 130, such as by sensor 132 or one or more components of one or more injectors 128.

As shown in FIG. 3, process 300 may include receiving operational information associated with a SCR aftertreatment system (block 310). For example, DCU 130 may receive operational information associated with SCR aftertreatment system 110.

The operational information may include information associated with operation of SCR aftertreatment system 110. In some implementations, the operational information may include information based on which a deposit prediction, associated with SCR aftertreatment system 110 can be generated, as described below.

In some implementations, the operational information may include information that identifies that identifies a temperature at a particular location of SCR aftertreatment system 110. For example, the operational information may include information that identifies a gas temperature at an entrance of inlet 114, a gas temperature within a given dosing zone 200, a gas temperature after a last dosing zone 200, and/or the like. In some implementations, DCU 130 may receive such temperature information from one or more sensors 132. In some implementations, DCU 130 may receive the temperature information based on providing, to a given sensor 132, a request for the temperature information. Additionally, or alternatively, DCU 130 may automatically receive the temperature information from a given sensor 132 (e.g., when sensor 132 is configured to automatically determine and provide the temperature information on a periodic basis).

Additionally, or alternatively, the operational information may include information that identifies an amount of DEF 122 dosed into SCR aftertreatment system 110. For example, the operational information may include information that identifies a volume of DEF 122 dosed (e.g., by a respective set of injectors 128) into a single dosing zone 200 of inlet 114 (e.g., in a given dose, during a particular period of time, and/or the like). As another example, the operational information may include information that identifies a total amount of DEF 122 dosed (e.g., by respective sets of injectors 128) into two or more dosing zones 200 of inlet 114 (e.g., in respective given doses, during a particular period of time, and/or the like). In some implementations, DCU 130 may receive such DEF dosage information based on information stored or accessible by DCU 130 (e.g., DCU 130 may determine the DEF dosage information since controls the amount of DEF 122 dosed by injectors 128). Additionally, or alternatively, DCU 130 may receive the DEF dosage information from injectors 128 (e.g., when injectors 128 are configured to measure or track the amount of DEF actually dosed and provide the DEF dosage information to DCU 130 on a periodic basis).

Additionally, or alternatively, the operational information may include information that identifies a flow rate at a particular location of SCR aftertreatment system 110. For example, the operational information may include information that identifies a flow rate of gas at an entrance of inlet 114, a flow rate of gas within a given dosing zone 200, a flow rate of gas after a last dosing zone 200, and/or the like. In some implementations, DCU 130 may receive such flow rate information from one or more sensors 132. In some implementations, DCU 130 may receive the flow rate information based on providing, to a given sensor 132, a request for the flow rate information. Additionally, or alternatively, DCU 130 may automatically receive the flow rate information from a given sensor 132 (e.g., when sensor 132 is configured to automatically determine and provide the flow rate information on a periodic basis).

As further shown in FIG. 3, process 300 may include generating a deposit prediction, associated with the SCR aftertreatment system, based on the operational information and using a deposit growth model (block 320). For example, DCU 130 may generate a deposit prediction, associated with SCR aftertreatment system 110, based on the operational information and using a deposit growth model.

The deposit prediction may include information associated with a predicted urea deposit build-up within inlet 114 (e.g., on a surface of inlet 114, on impingement plate 134, on a surface of mixer 136, and/or the like). For example the deposit prediction may include information that identifies a predicted size of the deposit (e.g., a predicted length, a predicted width, a predicted radius, a predicted thickness, and/or the like) within inlet 114.

In some implementations, DCU 130 may generate the deposit prediction using a deposit growth model that is stored or accessible by DCU 130 (e.g., the deposit growth model may be configured on DCU 130). The deposit growth model may include a model that receives, as input, operational information associated with SCR aftertreatment system 110, and provides, as output, a deposit prediction associated with SCR aftertreatment system 110. In some implementations, the deposit prediction, output by the deposit growth model, may include information associated with one or more deposits. For example, the deposit prediction may include information associated with one or more predicted urea deposit build-ups in a particular dosing zone 200 of inlet 114, information associated with one or more predicted urea deposit build-ups in each dosing zone 200 of inlet 114, and/or the like.

In some implementations, the deposit growth model may be a physics-based model. For example, the deposit growth model may be configured to utilize predefined evaporation rates associated with DEF 122 (e.g., an approximate evaporation rate of DEF 122 in exhaust air of SCR aftertreatment system 110, an approximate evaporation rate of DEF 122 on a surface of a component of SCR aftertreatment system 110, such as a surface of mixer 136, and/or the like), predefined deposit decay rates (e.g., an approximate decay rate of a deposit on mixer 136, an approximate decay rate of a deposit formed on impingement plate 134, and/or the like), predefined deposit growth rates (e.g., an approximate growth rate of a deposit when forming on mixer 136, an approximate growth rate of a deposit when forming on impingement plate 134, and/or the like), and/or another type of physics-based information.

In some implementations, the deposit growth model may be configured to generate the deposit prediction based on one or more predicted skin temperatures of one or more components of SCR aftertreatment system 110. For example, the deposit growth model may be configured to compute (e.g., based on the operational information) a predicted skin temperature on a surface of mixer 136 within inlet 114, and determine information that identifies a predicted size of a deposit on the surface of mixer 136 based on the predicted skin temperature of mixer 136. Notably, the deposit growth may be configured such that the deposit growth model does not utilize actual skin temperature measurements (e.g., information that identifies an actual temperature of a surface) and/or actual deposit measurements (e.g., information that identifies an actual size of a deposit), thereby reducing cost and/or complexity of SCR aftertreatment system 110, improving manufacturability of SCR aftertreatment system 110, and/or the like (e.g., as compared to a SCR aftertreatment system that uses direct measurements of skin temperature and/or deposit growth).

As further shown in FIG. 3, process 300 may include selecting a DEF dosing scheme based on the deposit prediction (block 330). For example, DCU 130 may select a DEF dosing scheme based on the deposit prediction.

The DEF dosing scheme may include information that identifies an amount of DEF 122 to be dosed by injectors 128 of inlet 114. For example, the dosing scheme may include information that identifies a portion (e.g., a percentage) of a total amount of DEF 122 (e.g., a total amount of DEF 122 that is to be dosed among all injectors 128) that is to be dosed by a particular injector 128. In some implementations, the total amount of DEF 122 may be determined (e.g., by DCU 130) based on an amount of $NO_x$ in exhaust gas 106, treated gas 112, and/or like, measured by sensor 132, as is known in the art.

FIG. 4 is a diagram illustrating example dosing schemes for injectors 128. A first example dosing scheme (e.g., dosing scheme A) is illustrated in the left column of FIG. 4. As shown, according to the first dosing scheme, injector 128 arranged to dose dosing zone 200-1 is to dose 40% of a total amount of DEF 122, injector 128 arranged to dose dosing zone 200-2 is to dose 30% of the total amount of DEF 122, injector 128 arranged to dose dosing zone 200-3 is to dose 20% of the total amount of DEF 122, and injector 128 arranged to dose dosing zone 200-4 is to dose 10% of the total amount of DEF 122. The first dosing scheme may be implemented when, for example, a deposit prediction indicates that a size of a deposit in dosing zone 200-1 and/or a size of a deposit in dosing zone 200-2 is less than a threshold size (e.g., in order to dose comparatively more in upstream dosing zones 200 that are at higher temperatures during heat up of diesel engine 100 and dose comparatively less in downstream dosing zones 200 until the deposit growth model predicts a fully thermally soaked inlet 114).

A second example dosing scheme (e.g., dosing scheme B) is illustrated in the right column of FIG. 4. As shown, according to the second dosing scheme, injector 128 arranged to dose dosing zone 200-1 is to dose 10% of a total amount of DEF 122, injector 128 arranged to dose dosing zone 200-2 is to dose 20% of the total amount of DEF 122, injector 128 arranged to dose dosing zone 200-3 is to dose 30% of the total amount of DEF 122, and injector 128 arranged to dose dosing zone 200-4 is to dose 40% of the total amount of DEF 122. The second dosing scheme may be implemented when, for example, a deposit prediction indicates that a size of a deposit in dosing zone 200-1 and/or a size of a deposit in dosing zone 200-2 is greater than or equal to a threshold size (e.g., in order to dose comparatively less in upstream dosing zones 200 and dose comparatively more in downstream dosing zones 200 in order to allow deposits in upstream dosing zones to decay).

Notably, according to both the first and second dosing schemes, 100% of the total amount of DEF 122 is dosed among the four dosing zones 200 of inlet 114. In some implementations, the dosing scheme may indicate that less than or greater than 100% of the total amount of DEF 122 is to be dosed (e.g., when permitted in a given application).

As indicated above, FIG. 4 is provided as an example in order to illustrate possible dosing schemes, and many other dosing schemes are possible.

In some implementations, DCU 130 may store or have access to information associated with a plurality of dosing schemes, and may select one of the plurality of dosing schemes for implementation in SCR aftertreatment system 110.

In some implementations, DCU 130 may select the dosing scheme based on the deposit prediction. For example, DCU 130 may determine whether a size of a predicted deposit, identified by the deposit prediction, satisfies a threshold, and may select the dosing scheme based on whether the size of the deposit satisfies the threshold.

As a particular example, assume that DCU 130 is configured with the first and second dosing schemes described above, and that DCU 130 has implemented (e.g., at engine startup, based on a previous deposit prediction) the first dosing scheme. Here, DCU 130 may generate a deposit prediction that includes information that identifies a predicted size of a deposit on a surface of mixer 136 at a boundary of dosing zones 200-1 and 200-2 (i.e., a surface of mixer 136 between dosing zones 200-1 and 200-2 in FIG. 2). In this example, if DCU 130 determines that the predicted size of the deposit on the surface of mixer 136 is greater than or equal to a threshold size, then DCU 130 may select the second dosing scheme (e.g., in order to reduce the amount of DEF 122 being dosed in dosing zone 200-1 such that a temperature in dosing zone 200-1 can increase in order to allow the deposit on the surface of mixer 136 to decay). Alternatively, if DCU 130 determines that the predicted size of the deposit on the surface of mixer 136 is less than the threshold size, then DCU 130 may select the first dosing scheme (e.g., such that DEF 122 continues to be dosed according the first dosing scheme).

As a particular example, assume that DCU 130 is configured with the first and second dosing schemes described above, and that DCU 130 has implemented (e.g., at engine startup, based on a previous deposit prediction) the second dosing scheme. Here, DCU 130 may generate a deposit prediction that includes information that identifies a predicted size of a deposit on a surface of mixer 136 at a boundary of dosing zones 200-1 and 200-2. In this example, if DCU 130 determines that the predicted size of the deposit on the surface of mixer 136 is greater than or equal to a threshold size, then DCU 130 may select the second dosing scheme (e.g., such that DEF 122 continues to be dosed according the second dosing scheme). Alternatively, if DCU 130 determines that the predicted size of the deposit on the surface of mixer 136 is less than the threshold size, then DCU 130 may select the first dosing scheme (e.g., in order to increase the amount of DEF 122 being dosed in dosing zone 200-1).

In some implementations, DCU 130 may select the dosing scheme based on a deposit prediction associated with a single dosing zone 200, as illustrated in the above examples. Additionally, or alternatively, DCU 130 may select the dosing scheme based on a deposit prediction associated with a multiple dosing zones 200. For example, DCU 130 may select the dosing scheme based on determining whether an average (e.g., a weighted average) of predicted deposit sizes, associated with the multiple dosing zones 200, satisfies a threshold. As another example, DCU 130 may select the dosing scheme based on determining whether each of a particular combination of predicted deposit sizes, associated with the multiple dosing zones 200, satisfies a threshold.

Additionally, or alternatively, DCU 130 may select the dosing scheme based on computing a predicted deposit score (e.g., a value from 0 to 99) that takes into account predicted deposit sizes associated with multiple respective dosing zones 200. For example, DCU 130 may compute a predicted deposit score based on (e.g., weighted) predicted sizes of deposits in each of dosing zones 200-1 through 200-4. Here, if the predicted deposit score is within a first range of values (e.g., from 0 to 49), then DCU 130 may select the first dosing scheme. Conversely, if the predicted deposit score is within a second range of values (e.g., from 50 to 99), then DCU 130 may select the second dosing scheme.

Notably, while the above examples are described in the context of selecting from the first and second dosing scheme, DCU 130 may be configured with three or more dosing schemes, and may select a dosing scheme from the three or more dosing schemes in a manner similar to any of those described above.

As further shown in FIG. 3, process 300 may include implementing the selected DEF dosing scheme (block 340). For example, DCU 130 may implement the selected DEF dosing scheme.

In some implementations, DCU 130 may implement the selected dosing scheme by causing injectors 128 to dose DEF 122 into dosing zones 200 of inlet 114 in accordance with the selected dosing scheme. For example, DCU 130 may send, to a given injector 128, DCU 130 may send, to a given injector, a control signal that causes the given injector 128 to dose an amount of DEF 122 in accordance with the selected dosing scheme.

As indicated in FIG. 3, DCU 130 may repeat process 300 (e.g., on a periodic basis, based on receiving information from sensor 132, and/or the like) such that DCU 130 repeatedly selects and implements dosing schemes based on deposit predictions. In this way, DCU 130 may manage urea deposit growth in SCR aftertreatment system 110 via multizone alternating variable DEF dosing utilizing a physics-based deposit growth and decay model.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The disclosed technique for managing urea deposit growth via multi-zone alternating variable DEF dosing utilizing a physics-based deposit growth and decay model may find industrial applicability in a variety of settings, such as an exhaust gas treatment system (e.g., SCR aftertreatment system 110) associated with a diesel engine (e.g., diesel engine 100). The disclosed technique uses a deposit growth model to generate (e.g., based on a predicted skin temperature associated with inlet 114) a deposit prediction associated with inlet 114. In some implementations, the deposit growth model outputs the deposit prediction based on receiving, as input, temperature information associated with inlet 114, DEF dosage information associated with inlet 114, flow rate information associated with inlet 114, and/or the like. A DCU 130 may select, based on the deposit prediction, a dosing scheme for dosing DEF 122 into inlet 114, and may implement the selected dosing scheme in order to manage deposit growth in inlet 114.

The disclosed technique provides improved deposit growth management within SCR aftertreatment system 110 which, in turn, provides improved control, predictability, and/or reliability of $NO_x$ reduction by SCR aftertreatment system 110 (e.g., by reducing or controlling risk of deposit build-ups in SCR aftertreatment system 110). Further, the technique described herein allows for thermally managed deposit growth and decay without reducing total DEF 122 dosing, while maintaining or improving $NO_x$ emissions reduction by SCR aftertreatment system 110.

Additionally, the disclosed technique increases efficiency of SCR aftertreatment system 110. For example, the disclosed technique may allow an overall amount of DEF that can be dosed in inlet 114 of SCR aftertreatment system 110 to be increased (e.g., as compared to a prior DEF dosing system). Such a benefit is useful in an application in which a total amount of DEF that needs to be dosed (in order to achieve adequate $NO_x$ reduction) is relatively high. In other words, the disclosed technique may increase dosing capability of SCR aftertreatment system 110 due to increased deposit robustness. As another example, the disclose technique may allow an overall amount of DEF that can be dosed in a given physical space (e.g., an inlet 114 with a given size) to be increased (e.g., as compared to a prior DEF dosing system). Such a benefit is useful in an application in which an amount of physical space available for inlet 114 and/or one or more other components of SCR aftertreatment system 110 is limited.

Additionally, the disclosed technique provides passive thermal management associated with SCR aftertreatment system 110. In order to allow DEF 122 to evaporate in inlet 114 (e.g., for mixing with exhaust gas 106), a threshold temperature should be maintained. Thus, energy of exhaust gas 106 entering the system is used raise the temperature within inlet 114. However, the phase change of DEF 122 (from liquid to gas) removes energy from the system, which can lower the temperature in inlet 114. As such, if DEF 122 is sprayed such that a rate at which energy is used (for the phase change of DEF 122) is greater than a rate at which energy enters the system, the temperature within a given portion of inlet 114 decreases and, therefore, a risk of urea deposit build-up within inlet 114 increases (e.g., since the temperature may not be sufficient to evaporate DEF 122). Thus, by providing improved deposit growth management, the above described techniques can be said to provide passive thermal management of SCR aftertreatment system 110.

Generally, it is expected that the multi-zone alternating variable DEF dosing technique that utilizes a deposit growth model, described herein, may find industrial applicability in a range of applications application to $NO_x$ aftertreatment systems in diesel engines.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents.

What is claimed is:

1. A dosing control unit (DCU), comprising:
one or more memories; and
one or more processors, communicatively coupled to the one or more memories, configured to:
receive operational information associated with a selective catalytic reduction (SCR) aftertreatment system;
generate a deposit prediction, associated with the SCR aftertreatment system, based on the operational information,
wherein the deposit prediction includes information that identifies a predicted size of a deposit in a dosing zone of a plurality of dosing zones associated with the SCR aftertreatment system, and
wherein the deposit prediction is generated using a deposit growth model associated with predicting sizes of deposits in the plurality of dosing zones;
select a dosing scheme, of a plurality of dosing schemes, based on the deposit prediction,
wherein the dosing scheme includes information that identifies:
a first portion, of an amount of diesel exhaust fluid (DEF), that is to be dosed by a first injector of a plurality of injectors in the plurality of dosing zones, and
a second portion, of the amount of the DEF, that is to be dosed by a second injector of the plurality of injectors, and
wherein the second portion is different from the first portion; and
implement the selected dosing scheme in order to cause the DEF to be dosed by the plurality of injectors in accordance with the selected dosing scheme.

2. The DCU of claim 1, wherein the operational information includes at least one of:
temperature information associated with the SCR aftertreatment system,
DEF dosage information associated with the SCR aftertreatment system, or
flow rate information associated with the SCR aftertreatment system.

3. The DCU of claim 1, wherein the deposit growth model is configured to predict sizes of deposits in the plurality of dosing zones based on predicting skin temperatures on surfaces in the plurality of dosing zones.

4. The DCU of claim 1, wherein the one or more processors, when generating the deposit prediction, are configured to:
generate the deposit prediction without using at least one of information that identifies an actual skin temperature on a surface in the dosing zone or information that identifies an actual size of the deposit in the dosing zone.

5. The DCU of claim 1, wherein the one or more processors are further configured to:
   determine whether the predicted size of the deposit in the dosing zone satisfies a threshold; and
   wherein the one or more processors, when selecting the dosing scheme based on the deposit prediction, are configured to:
      select the dosing scheme based on whether the predicted size of the deposit in the dosing zone satisfies the threshold.

6. The DCU of claim 1, wherein the operational information is first operational information, the deposit prediction is a first deposit prediction, the predicted size is a first predicted size, and the selected dosing scheme is a first dosing scheme,
   wherein the one or more processors are further configured to:
      receive second operational information associated with the SCR aftertreatment system;
      generate a second deposit prediction, associated with the SCR aftertreatment system, based on the second operational information,
         wherein the second deposit prediction includes information that identifies a second predicted size of the deposit in the dosing zone;
      select a second dosing scheme, of the plurality of dosing schemes, based on the second deposit prediction,
         wherein the second dosing scheme is different from the first dosing scheme; and
      implement the second dosing scheme in order to cause the DEF to be dosed in accordance with the second dosing scheme.

7. The DCU of claim 6, wherein the one or more processors are further configured to:
   receive third operational information associated with the SCR aftertreatment system;
   generate a third deposit prediction, associated with the SCR aftertreatment system, based on the third operational information,
      wherein the third deposit prediction includes information associated with a third predicted size of the deposit in the dosing zone;
   select the first dosing scheme based on the third deposit prediction; and
   implement the first dosing scheme in order to cause the DEF to be dosed in accordance with the first dosing scheme.

8. A selective catalytic reduction (SCR) aftertreatment system, comprising:
   one or more devices configured to:
      receive operational information associated with the SCR aftertreatment system;
      generate, based on the operational information, a deposit prediction that includes information that identifies a predicted size of a deposit in a dosing zone of a plurality of dosing zones associated with an inlet of the SCR aftertreatment system,
         wherein the deposit prediction is generated using a deposit growth model configured to predict sizes of deposits in the plurality of dosing zones;
      select a dosing scheme, of a plurality of dosing schemes, based on the deposit prediction,
         wherein the dosing scheme includes information that identifies:
            a first portion, of an amount of diesel exhaust fluid (DEF), that is to be dosed by a first injector of a plurality of injectors in the plurality of dosing zones, and
            a second portion, of the amount of the DEF, that is to be dosed by a second injector of the plurality of injectors, and
         wherein the second portion is different from the first portion; and
      implement the selected dosing scheme in order to cause the DEF to be dosed by the plurality of injectors in accordance with the selected dosing scheme.

9. The SCR aftertreatment system of claim 8, wherein the operational information includes at least one of:
   temperature information associated with the inlet,
   DEF dosage information associated with the inlet, or
   flow rate information associated with the inlet.

10. The SCR aftertreatment system of claim 8, wherein the deposit growth model is configured to predict sizes of deposits in the plurality of dosing zones based on predicting skin temperatures in the plurality of dosing zones.

11. The SCR aftertreatment system of claim 8, wherein the one or more devices, when generating the deposit prediction, are configured to:
   generate the deposit prediction without using at least one of information that identifies an actual skin temperature on a surface in the dosing zone or information that identifies an actual size of the deposit in the dosing zone.

12. The SCR aftertreatment system of claim 8, wherein the one or more devices are further configured to:
   determine whether the predicted size of the deposit in the dosing zone satisfies a threshold; and
   wherein the one or more devices, when selecting the dosing scheme based on the deposit prediction, are configured to:
      select the dosing scheme based on whether the predicted size of the deposit in the dosing zone satisfies the threshold.

13. The SCR aftertreatment system of claim 8, wherein the operational information is first operational information, the deposit prediction is a first deposit prediction, the predicted size is a first predicted size, and the selected dosing scheme is a first dosing scheme,
   wherein the one or more devices are further configured to:
      receive second operational information associated with the SCR aftertreatment system;
      generate a second deposit prediction, associated with the SCR aftertreatment system, based on the second operational information,
         wherein the second deposit prediction includes information that identifies a second predicted size of the deposit in the dosing zone;
      select a second dosing scheme, of the plurality of dosing schemes, based on the second deposit prediction,
         wherein the second dosing scheme is different from the first dosing scheme; and
      implement the second dosing scheme in order to cause the DEF to be dosed in accordance with the second dosing scheme.

14. The SCR aftertreatment system of claim 13, wherein the one or more devices are further configured to:
   receive third operational information associated with the SCR aftertreatment system;

generate a third deposit prediction, associated with the SCR aftertreatment system, based on the third operational information,
    wherein the third deposit prediction includes information that identifies a third predicted size of the deposit in the dosing zone;
select the first dosing scheme based on the third deposit prediction; and
implement the first dosing scheme in order to cause the DEF to be dosed in accordance with the first dosing scheme.

15. A method, comprising:
receiving operational information;
generating, based on the operational information, a deposit prediction,
    wherein the deposit prediction includes information that identifies a predicted size of a deposit in a dosing zone of a plurality of dosing zones, and
    wherein the deposit prediction is generated using a deposit growth model associated with predicting sizes of deposits in the plurality of dosing zones;
selecting a dosing scheme, of a plurality of dosing schemes, based on the deposit prediction,
    wherein the dosing scheme includes information that identifies:
        a first portion, of an amount of diesel exhaust fluid (DEF), that is to be dosed by a first injector of a plurality of injectors in the plurality of dosing zones, and
        a second portion, of the amount of the DEF, that is to be dosed by a second injector of the plurality of injectors, and
    wherein the second portion is different from the first portion; and
causing the DEF to be dosed by the plurality of injectors in accordance with the selected dosing scheme.

16. The method of claim 15, wherein the operational information includes at least one of:
temperature information,
DEF dosage information, or
flow rate information.

17. The method of claim 15, wherein the deposit growth model is configured to predict sizes of deposits in the plurality of dosing zones based on predicting skin temperatures on surfaces in the plurality of dosing zones.

18. The method of claim 15, further comprising:
determining whether the predicted size of the deposit in the dosing zone satisfies a threshold; and
wherein selecting the dosing scheme based on the deposit prediction comprises:
    select the dosing scheme based on whether the predicted size of the deposit in the dosing zone satisfies the threshold.

19. The method of claim 15, wherein the operational information is first operational information, the deposit prediction is a first deposit prediction, the predicted size is a first predicted size, and the selected dosing scheme is a first dosing scheme,
    wherein the method further comprises:
        receiving second operational information;
        generating a second deposit prediction based on the second operational information,
            wherein the second deposit prediction includes information that identifies a second predicted size of the deposit in the dosing zone;
        selecting a second dosing scheme, of the plurality of dosing schemes, based on the second deposit prediction,
            wherein the second dosing scheme is different from the first dosing scheme; and
        causing the DEF to be dosed in accordance with the second dosing scheme.

20. The method of claim 19, further comprising:
receiving third operational information;
generating a third deposit prediction based on the third operational information,
    wherein the third deposit prediction includes information associated with a third predicted size of the deposit in the dosing zone;
selecting the first dosing scheme based on the third deposit prediction; and
causing the DEF to be dosed in accordance with the first dosing scheme.

* * * * *